(No Model.)
J. T. WATERS & G. CLOPTON.
CIDER PRESS AND JUICE EXTRACTOR.
No. 572,936. Patented Dec. 8, 1896.
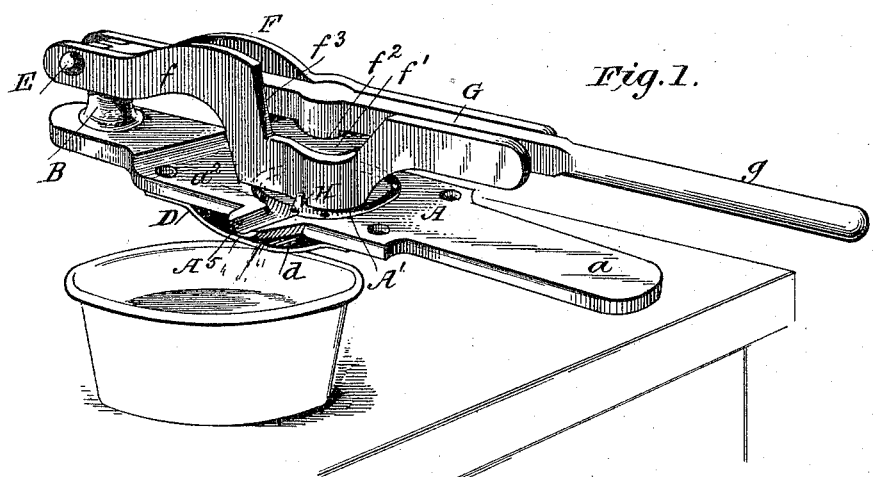
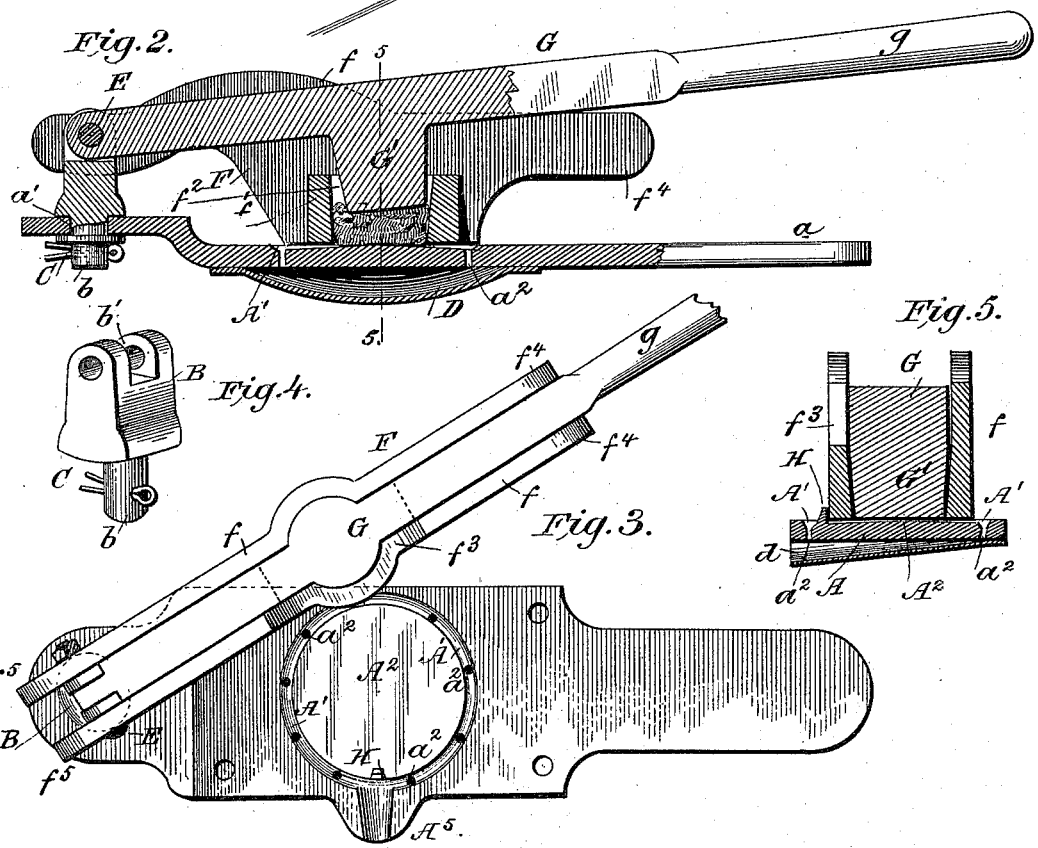
WITNESSES:
J. C. Shaw
J. Edw. Luckett
INVENTORS
John T. Waters
Guy Clopton
BY
Fred G. Dieterich & Co.
ATTORNEYS

UNITED STATES PATENT OFFICE.

JOHN THOMAS WATERS AND GUY CLOPTON, OF GAINESVILLE, GEORGIA, ASSIGNORS TO THEMSELVES AND W. I. HOBBS, OF SAME PLACE.

CIDER-PRESS AND JUICE-EXTRACTOR.

SPECIFICATION forming part of Letters Patent No. 572,936, dated December 8, 1896.

Application filed June 29, 1896. Serial No. 597,449. (No model.)

*To all whom it may concern:*

Be it known that we, JOHN THOMAS WATERS and GUY CLOPTON, residing at Gainesville, in the county of Hall and State of Georgia, have invented a new and Improved Cider-Press and Juice-Extractor, of which the following is a specification.

Our invention is in the nature of a hand-operated device which is adapted for use as a cider-press or juice-extractor, and such invention primarily has for its object to provide a device of this character of a very simple and inexpensive nature which can be easily manipulated and which will effectively serve for its intended purposes.

A further object of our invention is to provide a juice-extractor having a base member adapted to be held in one hand and a fruit-receiver and plunger operated by the other hand, and so connected with the base member as to admit of the pulp being thrown off at one side without raising the plunger or presser.

Another object of our invention is to provide a device for the purpose stated having the receiver portion arranged to receive the fruit from one side and movable with the plunger to the opposite side, thereby to admit of the quick discharge of the pulp after it has been pressed.

With other objects in view, which will hereinafter appear, our invention consists in a device for the purpose stated embodying the peculiar combination and novel arrangement of parts, such as will be hereinafter described and then specifically pointed out in the appended claims, reference being had to the accompanying drawings, in which—

Figure 1 is a perspective view of our device as in use. Fig. 2 is a longitudinal section thereof. Fig. 3 is a plan view illustrating the receiver and the plunger moved to one side to discharge the pulp. Fig. 4 is a detail view of the rotary hinge member. Fig. 5 is a transverse section taken on the line 5 5 of Fig. 2.

In the practical construction our invention embodies a base member or platform A, which has one end formed into a suitable handle $a$, and the other end apertured, as at $a'$, to receive the shank $b$ of a turn-post B, the upper end of which is bifurcated, as shown at $b'$, to form a hinge portion, while the lower end or shank $b$ projects below the base A and is held in place by a suitable key C, as clearly shown in Fig. 2.

About centrally the base A is made flared or widened and has at such point, on its upper face, a circular groove $A'$, which surrounds the presser-surface $A^2$, and which connects with a discharging-lip $A^5$, it also having a series of apertures $a^3$, through which some of the juice is adapted to pass into a receiving-trough D, secured on the under side of the member A. This trough D is secured to the member A in such a manner that but one end is left open, as at $d$, such end being so disposed that the juice can be discharged at the left side of the device, as will be clearly understood by reference to Fig. 1.

F indicates what we term a "receiver," and which comprises a pair of parallel side pieces $ff$, which are joined centrally by a block $f'$, which has a large aperture $f^2$, which forms the pocket for the fruit to be pressed.

By referring now more particularly to Fig. 5 it will be noticed the block $f'$ extends up but half-way the height of the side pieces, and the left-hand side piece is cut away flush with the top of the said block $f'$, as shown at $f^3$, to form a convenient passage or way for the fruit as it is entered at the left side, the right-hand side piece forming a stop to prevent the fruit passing over at the right of the receiver.

The rear ends of the side pieces $f$ terminate in handle portions $f^4 f^4$, while the front ends $f^5 f^5$ are apertured for the passage of the hinge-bolt E, which joins the receiver to the turn-post B.

G indicates the plunger-lever, which is hinged to the bolt E to swing vertically and of a width to snugly fit between the side arms $ff$, the free ends being extended to form a handle $g$. This lever has a plunger or presser block $G'$, which is adapted to snugly fit the pocket $f$ of the receiver, as clearly shown in Figs. 2 and 5, by reference to which it will also be seen that when the lever G is to its down position it rests between the side members $ff$ and is held in a locked engagement therewith, so that when swung laterally either to the right or left the lever G and the receiver F will move together.

From the foregoing description, taken in connection with the accompanying drawings, the operation of our device is best explained as follows:

The receiver being in place on the base, the lever G is swung up to allow the fruit being inserted from the left side into the pocket $f$. The lever G is then brought down to the position shown in Fig. 2, the presser-block $g$ serving to squeeze out the juice, which runs off onto the base A into the groove, out the lip $A^5$ and the trough D, and into a suitable vessel. After the fruit has been thoroughly pressed the lever G, without raising, is moved to the right, carrying with it the receiver F, until the pocket passes beyond the right side of the base, after which by giving the lever G a slight additional squeeze the block $g$ will force the pulp out of the pocket, after which the lever and the receiver are again moved to the left over the base, the left movement being limited by the stop H, which guides the receiver F and lever G to a proper position over the base A.

It is obvious that slight changes and modifications in the form of the several parts may be made without departing from the scope of the appended claims.

While we have shown our invention so arranged and adapted more especially as a hand-operated squeezing means, yet we desire it understood that the same can also be made in large sizes for orchard and vineyard purposes, the smaller ones being only intended for lemonade-stands and cook-room purposes.

When made in the large sizes, the base member A is provided with holes in the four corners, as shown, so that it can be screwed down to benches or blocks in such a manner that a suitable receptacle can be placed between them to catch the juice as it is pressed out.

Having thus described our invention, what we claim, and desire to secure by Letters Patent, is—

1. A device for the purpose described comprising a base member having a presser-face and a juice-collecting portion, a fruit-holding pocket hinged to the base for lateral and vertical movement and a hinged presser-lever having a plunger portion adapted to enter the fruit-pocket substantially as shown and for the purposes described.

2. The combination of a base member having a juice-collecting groove surrounding its presser-face, said groove having outlets, of a fruit-holder hinged to the base for lateral movements having a pocket and a presser-lever also hinged to the base and having a plunger to engage the fruit-pocket, said holder and lever being arranged to move laterally in unison as and for the purposes described.

3. The combination with the base member having an apertured juice-collecting groove and a receiver held thereunder and the turn-post B, of the holder F hinged to the post B, said holder having side members $f$, and a central apertured block $f'$ and the lever G hinged to the post B, having a plunger portion $G'$ adapted to fit the aperture in the block $f'$, said lever G being hinged to fit between the said members $f$ all arranged substantially as shown and for the purposes described.

4. A device for the purposes described comprising a base member having a juice-collecting portion surrounding its presser-face, a fruit-holder having a pocket, and a presser-lever having a plunger member adapted to enter the fruit-pocket, said fruit-holder and lever being hinged to the base to swing vertically and laterally independently or in unison as set forth.

5. The combination with the base A having a juice-collecting portion and the turn-post B, of the holders F, consisting of side members $f f$ and an apertured block $f'$ one of such members $f$ being cut away as at $f^3$ and the lever G having a presser-plunger $G'$ said lever and holder being hinged to the turn-post to swing upward all arranged substantially as shown and for the purposes described.

JOHN THOMAS WATERS.
GUY CLOPTON.

Witnesses:
W. I. HOBBS,
J. E. REDWINE, Jr.